3,490,355
PROCESS FOR THE PREPARATION OF ULTRA-INSTANTLY SOLUBLE DRY PRODUCTS
Wilhelm Groth, Melbweg 38, Bonn, Germany, and Peter Hussmann, Piazza degli Unganelli 3, Florenz, Italy
Filed Oct. 22, 1965, Ser. No. 501,342
Claims priority, application Switzerland, Sept. 13, 1965, 13,046/65
Int. Cl. A23b 7/02; A23c 1/00; F26b 3/06
U.S. Cl. 99—199       14 Claims

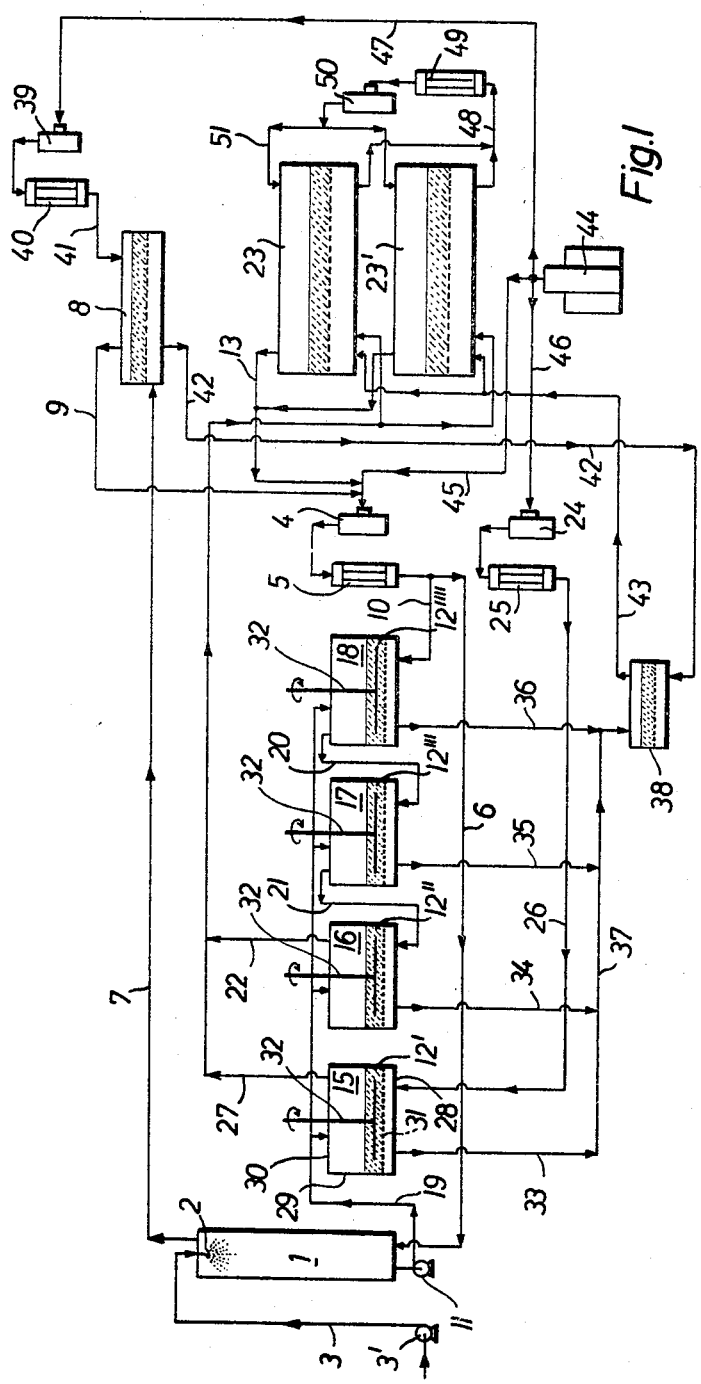
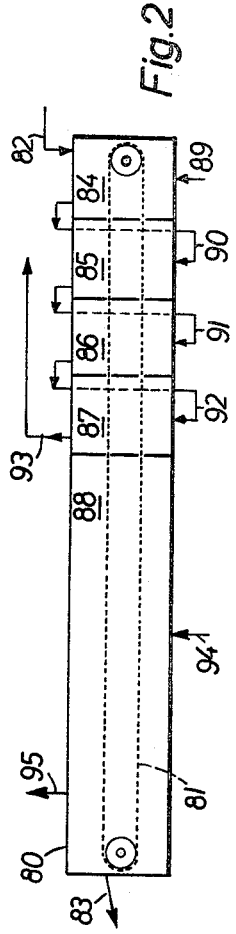
Fig.1
Fig.2

# United States Patent Office 3,490,355
Patented Jan. 20, 1970

ABSTRACT OF THE DISCLOSURE

A process for the production from a parent fluid material including dissolved solids an instantaneously soluble dried substance retaining the desirable properties of said parent material, comprising the steps of: providing a stratum of said parent material within a confined space; providing a substratum of cushion-support; providing a stream of dried uniform gas particles through said substratum toward the bottom of said stratum, said gas particles selected of a size in a range between 1 and 200 millimicrons; under a pressure permitting suspension of said fluid material and penetration of said gas particles therethrough uniformly dispersed; said gas being selected from gases non-reactive with said parent material; said stream being maintained for a period required to dehydrate said parent material to a viscosity sufficiently high to retain the wake of the stream of said gas particles uniformly dispersed therein suspended within the dried resulting solid whereby said material is reduced to a dehydrated micro-porous dry and fast soluble substance.

BACKGROUND OF THE INVENTION

Field of the invention

This invention relates to a process for the production of improved dry powders which are particularly rapidly ultra-instantly soluble even in cold liquids from starting materials which contain, in mixture with one another, constituents which are liquid and solid at the treating temperature in the form of solutions, emulsions, dispersions, pastes or the like.

DESCRIPTION OF THE PRIOR ART

In all of the previously known drying processes where use is made of air or gas as the heat carrier. Such a carrier will be referred to hereinafter as the "drying medium." In the prior art processes the drying medium contacts only the surface of the material to be dried so that it takes up a certain amount of moisture only from the outer layer of the material being dried. Additional moisture can be taken up and entrained by the drying medium only to the extent to which the moisture is capable of diffusing from the interior of the material being dehydrated into the surface layer. Accordingly, the degree of dehydration and the drying effect are inherently related in all known air or gas drying processes to the diffusion effect of the liquid within the material to be dried. This diffusion effect is relatively low at normal temperature and at relatively high layer depths of the material to be dehydrated. Therefore it is necessary in the prior art drying processes to use either a very expensive apparatus and complicated equipment or to employ a high amount of power to be used in the form of, for example, relatively high temperatures or of cooling (freeze drying) or in the form of kinetic energy (flash drying) or for similar expensive treatments. Moreover, the use of heat or cold energy involves the additional known disadvantages of loss of flavor and/or of adversely influencing the structure of the material being dehydrated, which is disadvantageous especially in the treatment of sensitive foodstuffs such as coffee, tea, fruit juices and the like.

SUMMARY OF THE INVENTION

It is the main object of the present invention to provide a mildly acting dehydration process for moisture- and liquid-containing substances of any kind which is operated without heat and without vacuum and which does not necessitate a high investment in the apparatus.

It is a further object of the present invention to convert solutions, emulsions, liquids and pastes of any kind into a dry powder which is instantly soluble in cold liquids such as cold water, the conversion being effected at normal temperatures substantially without a loss of flavor and while avoiding any denaturation phenomena and while using simple process conditions.

It is a still further object of the present invention to provide a process for the production of ultra-instantly soluble dry coffee and dry tea which is soluble even in cold water, said process involving no detrimental effect on flavor.

It is another object of the present invention to provide a process for converting natural unskimmed milk into unskimmed milk powder which is 100% soluble in a few seconds even in cold water.

It is a still further object of the present invention to provide a process for the drying of materials, which comprises arranging the material to be dried as a stationary bed having a depth of 1 mm. to 1000 mm. on a support consisting of a microporous solid material; thereafter forcing a gaseous drying medium having a temperature of from 2° to 80° C. and preferably 10° to 30° C. through said porous support in upward direction for 1 to 200 hours thereby ultrafinely dividing said drying medium, and passing said ultrafinely divided drying medium in a direction normal with respect to the bottom surface of said stationary bed of the material to be dehydrated, and forcing it through the material to be dried until the latter has lost its total content of moisture and is present in a dry, porous pumiceous form.

Other objects and advantages of the present invention will be described in detail in the following specification with reference to the accompanying drawings.

BRIEF DESCRIPTION OF THE DRAWINGS

FIG. 1 is a flow diagram of a unit comprising a stripper column for removing the aroma and flavor components from the material to be dried and four reaction vessels, and FIG. 2 represents diagrammatically a belt conveyor on which a plurality of reaction chambers is arranged.

FIGURE 3 is a flow chart of the method of the present invention, showing in solid blocks the essential steps and in broken line blocks additional optional steps which are not necessarily concurrent.

DESCRIPTION OF THE PREFERRED EMBODIMENTS

In the process of the invention, the starting product for the preparation of the dry powder is filled into a suitable reaction vessel. The starting product may be in the form of liquid or pasty materials, solutions, suspensions of foodstuffs or other products, especially chemical products of any kind and may be especially a fruit juice or fruit juice paste, a vegetable slurry, mashed potatoes, blood, yeast, a plant extract, pectin, gelatine, glue, a fish or meat paste, a meat or fish extract or a milk product such as unskimmed milk, skimmed milk, cream, butter, yoghurt, cured of skimmed or unskimmed milk, a milk mixed drink, cocoa prepared with milk or a coffee or tea extract. The reaction vessel has a lower net- or grid-shaped bottom and a top cover provided with gas outlet openings as well as rigid side walls. It has conveniently cylindrical shape. At a distance of conveniently 200 mm. from the lower tray, there is provided as an intermediate tray a microporous supporting substance which, for example, consists of a plastic material. The material to be dehydrated is placed on this support as a bed having a depth of from 1 to 1000 mm. Then highly dried nitrogen or $CO_2$ in case of all products which are sensitive to oxidation or highly dried air if permitted by the product due to its resistance to oxidation is introduced through the bottom of the vessel and passed in upward direction through the porous support. By the forcing of this gas stream through the microporus support, the stream is divided into many small individual particles so that it represents a disperse phase. This divided gas is forced onto the bottom surface of the material being dried and arranged on the support and the pressure is increased until the finely dispersed gas is forced through the entire layer of the material to be dried and carried by the support. This initiates the consolidation and solidification beginning in the bed interspersed with the disperse gas and becoming perceptible in the various stages of different concentration by increasing viscosity. The degree of division of the gas stream may be varied by varying the pore diameter of the porous support. Suitable supports are fabrics of textile material, plastic material, steel fibers or other metal fibers, or porous sintered materials or metals or the like which ensure microdivision of the gas stream. The bed of the material being dried and located on this porous support may be stirred or otherwise slightly agitated while the finely divided gases are passed through, at least as long as the material being dehydrated is in a relatively fluid state. Stirring or agitation is discontinued as soon as the viscosity of the material being dehydrated becomes relatively high.

In addition to the above-mentioned pressures, additional pressures necessary to move the gas to the whole system including the adsorption chambers are provided.

The layer depth of the material being dehydrated which may range between 1 mm. and 1000 mm. and which is preferably adjusted to 10 to 400 mm. may be varied depending upon functional or economical points of view.

The degree of division and the velocity at which the gas is passed through the liquid layer are of importance to the efficiency of the process of the invention. In general, the velocity ranges between 0.2 and 2 meters per second when drying liquids in accordance with the invention. For purées, the velocities are somewhat lower. When using excessively high gas flow velocities, excessively serious and undesirable foaming will occur at least in the initial dehydration stage. This can be avoided by initially operating with a lower velocity or under a lower pressure and, after the bulk of moisture has been removed and the material being dehydrated has assumed a relatively highly viscous state, increasing the pressure at which the gas in divided state is forced through the material being dried in a manner such that the initial throughput rate of the gas is maintained, if desirable.

If the process of the invention is used to treat products which contain readily volatile flavor or aroma substances which are removable with the gaseous dehydrating medium such as orange juice or coffee or tea extracts or the like, the flavor or aroma substances are separated intentionally in a preliminary stage before the dehydration process proper. This may be effected by passing the starting material into a stripper column where a fraction of the inert gas such as nitrogen or $CO_2$ used in the entire system, viz. about 1 to 3%, is used to withdraw the bulk of aroma or flavor from the material being dried, said aroma or flavor being taken up by the dry inert gas. To this end, the starting material would be intimately contacted with the inert gas by distributing and washing or by means of Raschig columns. This has the result that all of the aroma or flavor components of readily volatile character pass over into the gaseous medium. The inert gas stream which contains the aroma or flavor substances and small amounts of water is subsequently introduced into a special adsorption unit where the aroma or flavor components and the water are separated from the inert gas or the air. The aroma and flavor substances are accumulated and stored in these special adsorption units which have comparatively small dimensions and are filled with special adsorbents having wide pores until they are released by selective desorption without having suffered any damage. Selective desorption is effected at a time when the material which is to be dried and from which the aroma and flavor components have been withdrawn is present in the finished dehydrated state. The desorbed aroma and flavor components are then added to the finished dehydrated material and re-adsorbed by the same. Thus, the finished dehydrated powder contains the same aroma and flavor substances in the same composition as the starting product. This has the advantage that the dried product prepared in accordance with the invention shows no difference from the fresh product with respect to taste and flavor.

The process of the invention may be operated batchwise or continuously. When operated continuously, the process may be carried out in a single reaction vessel, or a plurality of reaction vessels, especially 4 to 8 reaction vessels may be connected in parallel. Depending upon the product to be processed, they may be provided with a stirrer or not. They are arranged above the microporous support, and the material to be dehydrated is placed into the vessels to a layer depth of from 1 to 1000 mm. The gaseous drying agent is then passed through the liquid layers in each of the vessels under a specific superatmospheric pressure of, for example, 50 to 1200 mm. water column which must overcome the above mentioned resistances. By means of the microporous supporting material, the gaseous medium is brought into an ultramicroporous dispersion, and the gas is then present in a finely divided state similar to that of an emulsion. When the gas is forced through the layer of the material being dehydrated, the divided droplets are present in an order of magnitude which, for example, may be as low as 1 to 200 millimicrons. This permits permanent, very dynamic maintenance of a steady state throughout the process and leads to solidification of the product in pumiceous porous form as the concentration of the material being dehydrated increases, i.e. as the moisture content decreases.

Both in continuous and batchwise operation of the process, the pressure can be changed in certain phases of the process. This is important if maximum saturation can be achieved by a given increase in pressure in the partially solidified state of the material being dehydrated when the water content has become so low that the rate of dehydration drops progressively.

In another advantageous mode of operation, the gas stream may be returned and repeatedly passed through the layer of the material to be dried. This merely requires sectioning of the gas supply perhaps in a manner which comprises passing the fresh, completely dried inert gas, at a first partial section of the lower surface of the material to be dried and at a given pressure, through the porous support and through the layer of the material to be dried; passing the gas emerging from the upper surface and loaded with moisture from the material being dried to the lower side of the second partial section of the material to be dried and forcing it again through the microporous support and through the layer of material to be dried. In doing so, saturation with moisture increases. The inert gas is withdrawn from the upper surface of the second partial section and passed to the underside of the third partial section of the bed of material being dried where it is again forced through the porous support and in upward direction through the layer of material being dried, at the upper surface of which it is either vented or led to a fourth partial section as described above. Depending upon the material being treated and its quantity, units may be provided where the inert gas stream is recycled as many times as desired, it being possible as required to provide drying units for intermediate drying of the inert gas.

It is advantageous in the process of the invention to use highly dried inert gas which is preferably dried before its use to a water content of from 0.002 to 0.001 g./cu. m. so that it has a dew point of −72° C. to −76° C. This can be achieved by the use of very efficient adsorbents and a specific relation of adsorbent and temperatures, efficiency and velocity of the gas stream.

Due to the long time of contact between the material being dehydrated and the inert gas in the process of the invention, the inert gas must be brought to maximum purity. For example, nitrogen which is obtained in a purity of 99.8% when separated from liquid air must be brought to a purity of 99.99% prior to being used in the process of the invention, e.g. by being passed over glowing copper or by means of other known methods. The content of 0.2% of oxygen present in commercial nitrogen is only tolerable under circumstances when drying substances which are insensitive to oxygen. Freedom from oxygen of the nitrogen is particularly essential when processing unskimmed milk and pharmaceutical and chemical products by the process of the invention. In case of fruit juices, nitrogen may preferably be replaced by $CO_2$ as the inert gas which also should be as free from oxygen as is possible since fruit juices are very sensitive to fermentation and $CO_2$ has also a preserving character. The acidic character of $CO_2$ is not detrimental to fruit juices or fruit pastes. It may be neglected in case of all products having a pH below 4.5 to 5.

Care should be taken at any rate that the inert gas used is free from bacteria.

The volume of inert gas recirculated through the system is relatively low since a closed system may be operated with gas recycling. For a 1000 liter $H_2O$ evaporating unit, the volume of the entire equipment comprises a maximum of 2000 cu. m. inclusive of the relatively voluminous various adsorption units used for the separation of aroma and flavor components and for the selective desorption as well as for the dehydration of the bulk of the inert gas. Since the inert gas is used at a high degree of purity, the dehydration unit may be interposed without detrimentally affecting the economy of the process.

The apparatus and equipment may be designed and arranged in such a manner that maintenance and repair work is simple and convenient. The reaction vessels and the porous supports which are arranged at a distance of from 20 to 2000 mm. from the lower bottom of the reaction vessels depending upon the dimensions of the reaction vessels are directly connected to the inert gas inlet between the bottom and are also directly connected to the gas outlet at the top of the vessel.

The diameter of the reaction vessels is dimensioned in functional relation to the working conditions. The velocity of the gas stream may be varied, for example, between about 0.2 and 3 meters per second at the particular layer depth of the material to be dried of, for example, 300 mm. The velocity at which the gas passes through the layer is perferably 0.4 to 1.5 meters per second as long as the material being dried is liquid or semi-solid. The gas flow velocity decreases as the viscosity of the material being dried increases due to the removal of moisture. The decrease in gas flow velocity may be counterbalanced by constantly or intermittently increasing the pressure at which the inert gas is forced through the layer consistently with the increase in viscosity of the material being dehydrated.

In a 5000 liter unit which is equipped with cylindrical reaction vessels of 4 to 8 meters in diameter and wherein from 50,000 to 60,000 cu. m. of $N_2$ are recycled, the gas flow velocity used is desirably 0.8 to 0.9 meter per second depending upon the degree of saturation and the temperature, the upper limit of the velocity being about 1 to 1.2 meters per second and the lower limit of the velocity being at about 0.4 to 0.5 meter per second.

The height of the reaction vessels is desirably at least 1 meter. When processing products which tend to foam initially, reaction vessels having a height of 3 to 4 meters may be used. In general, it is not necessary to use reaction vessels having a height of more than 1.5 to 2 meters above the porous support.

The reaction vessesls are preferably made of chrome nickel steel or plastic-lined iron. They may also be constructed of self-supporting plastic materials.

In a unit equipped for continuous operation, from 4 to 8 reaction vessesls may be advantageously operated in parallel. It is also possible for example, to use an endless belt conveyor which may consist of the porous supporting material, is slidingly moved on a support and subdivided into individual cells which are sealed against one another. The dried inert gas is introduced into the first cell and, when emerging from the surface of the layer, returned to the underside of the second cell unit and so on to the last cell unit until it is completely saturated. It is possible with belt conveyers of this kind to operate with very thin layers of the material being dehydrated of a thickness from 1 to 100 millimeters.

At the end of the belt, the dried material is desirably taken off and transferred into a larger reaction vessel which is filled therewith to a level of 200 to 1000 mm. Here, superdrying with fresh and highly dehydrated inert gas or air may be effected whereupon the aroma and flavor components released from the special adsorption unit by selective desorption are added to the dried material.

In view of the importance of the aroma and flavor of the dehydrated products, the re-adsorption phase represents a complement of the process of the invention for such type of foodstuffs and the like. If desired, the dried product may be subjected to crushing and/or grinding.

It is possible by the process of the invention due to the possibility of controlling the velocity of the inert gas and due to the microdistribution of the inert gas by means of the microporous support to convert the material being dehydrated into a highly viscous phase and to cause it to solidify in a highly porous form. This involves continuous direct transitions from the highly viscous state into the setting state and the solidified state and, consequently, the dried finished material is present in a high degree of porosity and fine-pored state. This imparts to the dried material a structure which permits redissolution in cold water or solvents instantaneously with a lightning-like speed. Moreover, the dried product as such represents an adsorbent for the aroma and flavor components which have been selectively removed from the separate adsorption unit and added to the dried material. Upon completion of the process of the invention, the dried material obtained has a structure similar to that of pumice stone. The volume of the material dried by the process of the invention is unchanged as compared with the volume of the charged layer of the material to be dried and still containing the moisture. The dried material may be ground to any particle size desired or processed to pellets which have the same outstanding solubility as the unground product. The finished product is stable in storage for extended periods of time, It may be packed without any difficulty by conventional methods. As compared with dehydrated products prepared by previously known processes, the product obtained in accordance with the invention is distinguished by particular quality and structure. It is much more rapidly soluble than the known products. Coffee or tea which has been dried by the process of the invention is instantaneously soluble in warm water and completely soluble in cold water within a few seconds. Unskimmed dry milk prepared by the process of the invention is 100% soluble even in cold water in a few seconds.

The process of the invention is operated at lower cost than the previously known drying processes, e.g. spray drying. As compared with the known freeze drying process, the cost of the process of the invention is only about one-tenth to one-fifteenth. Investment cost of the process of the invention is only one-fourth to one-fifth of that of a freeze drying unit. The apparatus used for the process of the invention can be controlled fully automatically.

The bulk weight of the dehydrated material obtained by the process of the invention may be adjusted to any value desired by varying the operating conditions, e.g. by varying the pressure and the inert gas flow velocity.

Plants of any size may be constructed for the performance of the process of the invention and operated economically. Small units having a capacity of, for example, 10 kgs. of $H_2O$/hr. can be installed with substantially and relatively the same low investment cost as commercial units. No upper limit on capacity exists. Plants for 1000, 5000, 10,000 to 100,000 kgs. $H_2O$/hr. may be constructed and operated.

It is to be emphasized that damage to the material being dehydrated is absolutely precluded due to operation at normal temperatures ranging preferably between 10 and 30° C., especially by avoiding low temperatures which must be used in freeze drying. Moreover, when processing emulsions such as unskimmed milk the risk or disintegration can be avoided with certainty either by pre-homogenization and pre-concentration or by interposing a homogenization stage after having suitably discontinued the concentration process.

The quality of the dehydrated products obtained by the process of the invention is so excellent that they are substantially indistinguishable from the liquid starting products. This is true for fruit juices and fruit pastes as well as for milk products such as unskimmed milk, skimmed milk and milk mix drinks, and this equally true for coffee or tea or the like. The loss in aroma and flavor and denaturation phenomena which are frequently encountered in known processes of this type are entirely eliminated in case of the process of the invention.

A detailed description of the process of the invention is given in the following examples with reference to individual fields of use.

EXAMPLE 1

In a conventional extraction unit, coffee was extracted very carefully and 591 kgs. of the resultant coffee extract representing a dry substance of 15% were introduced by the feed pump 3' through feed line 3 together with 1,200 m.³ hr. of nitrogen gas through the distributing nozzle 2 into the stripper column 1 and partially dearomatized. The nitrogen gas was passed by the central blower 4 through heat exchanger 5 and through line 6 into the stripper column 1. The nitrogen gas loaded with aroma and flavor components was passed from the stripper column 1 through line 7 and into the absorbent bed 8 where the aroma and flavor components and the water contained in the inert gas were adsorbed and accumulated. The aroma- and flavor-free inert gas was returned to the central blower 4 through line 9.

By means of the conveyor pump 11, the dearomatized coffee extract from the stripper column 1 is passed through line 19 and uniformly distributed to four reaction vessels 15, 16, 17, and 18. The reaction vessels have a cylindrical shell 29 and a diameter of 4.8 meters so that the entire supporting surface for the coffee extract being dried is 18 sq. m. Each reaction vessel has an overall height of 2 meters and is closed at the top and at the base by means of a lower bottom 28 provided with openings for discharging the dried material and for introducing the inert gas line and with a cover 30. Arranged at a distance of 200 mm. from the lower bottom 28 is a microporous intermediate tray 31 consisting of plastic material. This intermediate tray 31 is also provided with a radial slot. Highly dehydrated nitrogen having a temperature of 34° C. and a water content of 0.002 gm./cu. m. is directed in upward direction through the intermediate tray 31. The gas is introduced continuously by means of the central blower 4 and heat exchanger 5 through the central line 10 at the base of the reaction vessel 18. Intensive dispersion takes place within the layer 12 of the material being dried and contined in reaction vessel 18. The stirrer 32 arranged in the recation vessel may be actuated. The inert gas leaves the vessel 18 at the top and is passed through line 20 to the base of the reaction vessel 18 and through the layer 12 from which water is withdrawn. The nitrogen gas having an increased water content is passed from reaction vessel 17 through line 21 and into the base of reaction vessel 16 and forced through the porous support arranged therein and through the layer 12″ of material to be dried. The inert gas which is now saturated with moisture is withdrawn from the top of the vessel 16 through line 22 and passed through the recycle line 27 into the main water adsorption bed 23 or 23'. Dry inert gas supplied by the blower 24 through heat exchanger 25 and through the main line 26 is introduced into the reaction vessel 15 at an increased pressure of 200 mm. water column. This gas is directed through the porous supporting tray 31 in reaction vessel 15 and through the layer 12' of material to be dried and having already assumed a highly viscous state. The moisture-loaded inert gas is withdrawn from reaction vessel 15 through line 27 and passed into the central water adsorption bed 23 or 23'.

The reaction vessels 15, 16, 17, and 18 are filled to a layer depth of 300 mm. The overall drying process in the four units having a total surface area of 72 sq. m. takes a total of 36 hours. The process requires 60 cu. m. per hour of nitrogen which is brought to 80% saturation. Based on the total surface area available, this corresponds to an average velocity of 0.9 meter per second.

After saturation, the water is removed from the inert gas by adsorption in the central water absorption bed. After having passed through this bed, the inert gas is withdrawn from this bed through line 48 and returned via a heat exchanger 49 and a blower 50 to the main blower 4 from whence the dehydrated inert gas is returned into the cycle.

In reaction vessels 15, 16, 17, and 18, the material present in the layers 12', 12″, 12‴, and 12⁗ assumes a steadily increasing viscosity. A mass which slowly solidifies in upward direction is formed, this mass finally solidifying through the cavities formed to a more or less continuous porous cake. Due to the low residual water content of the nitrogen and consequently the difference in partial pressures, overdrying to 1.5% of residual moisture may be achieved.

Upon completed drying, the aroma and flavor components are selectively desorbed from the adsorption unit 8. This is achieved by regeneration only by means of heat with a very small amount of inert gas introduced via the blower 39 and the heat exchanger 40 through line 41 into the absorption bed 8. The aroma and flavor components, by means of the nitrogen carrier gas and line 42, are integrated into the highly microporous dry coffee powder. The dried coffee powder has been introduced from each of the reaction vessels 15, 16, 17 by means of the stirrers 32 arranged therein and through discharge lines 33, 34, 35 and via the conveyor mechanism 37 into the collecting vessel 38 in which the line 42 carrying the carrier gas loaded with aroma and flavor components terminates.

The dried material is reduced to a suitable particle size in any suitable manner. The dust content is less than 5% so that re-dissolution of the dust and recirculation into the process is not necessary. The powder containing inert gas of 99.9% purity is packed in any packaging unit with exclusion of oxygen. After storage for any extended period of time, it is instantly soluble even in cold water.

EXAMPLE 2

Preparation of banana purée

In this experiment, 672 kgs./hr. of banana pulp containing 25% of dry substance are processed by the process of the invention to form a dry powder containing 3% of residual moisture. The banana pulp is introduced into the reaction vessels 15, 16, 17, and 18 as described in Example 1. The depth of the layers 12', 12'', 12''' and 12'''' on the porous supporting tray 31 was 330 mm.

Flavor and aroma components had previously been removed from the banana pulp in the stripper column 1 as described in Example 1. The aroma and flavor components were accumulated and enriched in the adsorption bed 8 as also described in Example 1.

The process of the invention was carried out with 60,000 cu.m./hr. of dehydrated nitrogen of 24° C. which, as described in Example 1, was passed through lines 10, 20, 21 into the reaction vessels 18, 17, and 16 and through line 26 into the reaction vessel 15 and thence through the layers of the banana pulp 12', 12'', 12''' and 12'''' to be dried. Dehydration of the moisture-enriched nitrogen stream was effected as described in Example 1 in the central adsorption unit 23 or 23'. The dehydration process was effected for 40 hours.

There were obtained per hour 172 kgs. of banana powder which was transferred from the reaction vessels 15, 16, 17 and 18 by means of discharge mechanisms 33, 34, 35, and 36 and by means of the conveyor mechanism 37 into the collecting vessel 38 where the banana aroma and flavor components selectively desorbed from the adsorption bed was integrated in the dry banana powder. Thereafter, the powder was ground to the particle size desired and passed to the packaging unit.

Upon reconstitution with water, banana pulp is obtained which is undistinguishable from the starting product. Dissolution takes instantaneously in cold water.

EXAMPLE 3

As described in Example 1, 570 kgs. of tea extract having 12% of dry substance were converted into a dry powder containing 3% of residual moisture. The tea extract had been obtained in extractors known per se with all aroma and flavor components escaping having been collected and accumulated in the adsorption bed 8. The tea extract, by means of the feed pump 3', was continuously introduced through the feed line 3 and through the distributing nozzle 2 into the stripper column 1 where aroma and flavor components still contained in the extract were stripped off and also introduced into the adsorption bed 8 and accumulated therein. From stripper column 1, the tea extract was passed through feed line 18 into the reaction vessels 15, 16, 17, and 18 to form layers having a depth of 300 mm. on the porous supporting tray 31.

The highly dehydrated nitrogen supplied through lines 10, 20, 21 and 26 from the central blower 4 and through heat exchanger 5 and by means of the blower 24 and through heat exchanger 25 had a temperature of 24° C. Highly dehydrated nitrogen was passed through the apparatus at a rate of 60,000 cu.m./hr. The nitrogen was used until its saturation was 80–90%. Then the moisture-loaded nitrogen was passed through lines 22 and 27 into the main water adsorption bed 23 and 23', respectively, where it was dried and returned into the cycle as described in Example 1.

The process was operated for 36 hours and resulted in 70 kgs./hr. of tea powder which is transferred in dry state from the reaction vessels 15, 16, 17, and 18 by means of the discharge mechanisms 33, 34, 35, and 36 and by means of the conveyor mechanism 37 into the collecting vessel 38. Here, the aroma and flavor components which had been previously accumulated in the adsorption bed 8 and desorbed therefrom as described in Example 1 and introduced through line 42 were added to the dry tea powder. The aroma and flavor components were fully adsorbed by the dry tea powder.

The dry tea powder integrated with the aroma and flavor components was ground to the particle size desired and passed to the packaging unit to be packed in any manner desired. When dissolved in cold or warm water, the powder gave a tea beverage which was undistinguishable from freshly brewed tea.

EXAMPLE 4

Fresh tomato juice or pulp at a rate of 533 kgs./hr. was converted into a dry powder having a residual moisture content of 3%.

The tomato juice or pulp had been obtained by careful pasteurization and pulping. It was charged to the reaction vessels to a level of 300 mm. The aroma and flavor components were separated and accumulated in the manner described in Example 1. Drying was effected with highly dehydrated nitrogen used at a rate of 60,000 cu.m./hr. and at a temperature of 24° C. The dehydrated nitrogen was passed in succession into the four reaction vessels 18, 17, 16, and 15 in upward direction until its saturation was 80 to 90%. The drying process took 36 hours and resulted in 33 kgs./hr. of tomato powder. The total amount of accumulated aroma and flavor components was integrated in the superdried powder before the latter was reduced to the particle size desired by grinding and passed to the packaging unit.

The product obtained when reconstituted by dissolution is equivalent to fresh tomato juice or pulp.

EXAMPLE 5

Unskimmed milk powder is prepared by the process of the invention. If, for quality reasons, use is not made of a preconcentration at low temperatures and with dehydrated nitrogen as described in the specification, a concentrate obtained by evaporation 1:4 in a modern vacuum evaporator, i.e. having 52% of dry substance with an initial dry substance content of 13% is used as the starting material. Prior to being charged to the dehydration unit, this concentrate is subjected to thorough homogenization. At this concentration there is no risk that the emulsion will break in the subsequent dehydration process.

Unskimmed milk concentrate in an amount of 4132 kgs. is processed. Based on 52% of dry substance and 3% of residual moisture, this gives 2132 kgs. of powder. The amount of $H_2O$ to be evaporated is 2000 kgs. At an overall drying time established of 12 hours, dehydration reaction vessels having an overall surface area of 166 sq.m. are necessary with a layer depth of 300 mm. Use was made of two reactor units having each an overall surface area of 83 sq.m. of porous bottom tray. The height was 2 m., the distance between the porous bottom tray and the lower bottom was 400 mm. The diameter of the two reactor units was 10.3 m. each. Pure nitrogen gas of 99.99% purity and containing 0.002 gm. of $H_2O$ per cu.m. was used.

The milk charged was previously degassed to remove also the oxygen content of the milk itself. Then the milk was intimately contacted in highly dispersed form with the drying medium introduced through the porous bottom of the reaction vessels. The amount of nitrogen gas necessary as the drying medium for the removal of 2000 kgs. $H_2O$/hr. was 220,000 cu.m. The temperature was 26° C. The completely dry gas was first passed completely or partially through that reaction vessel where drying had progressed to the highest degree. A step for the separation and recovery of aroma and flavor components as described in Example 1 was interposed in simplified form.

In the final phase, the powder was dried down to 1.5 to 2% residual moisture which increased to 3% of residual moisture after adsorption of the aroma and flavor components. After 12 hours, a pumiceous, dry, partially friable cake was obtained which was reduced to granules of the size desired by careful grinding. The resultant powder is ultra-instantly soluble even in cold water. Excessive amounts of fines, i.e. in excess of 4 to 5% which may, but normally will not be produced are passed to re-dissolution.

The quality of the milk reconstituted by re-dissolution is absolutely equivalent to that of the starting milk.

What is claimed is:

1. A process for the production from a parent fluid material including dissolved solids of an instantaneously soluble dried substance retaining the desirable properties of said parent material, comprising the steps of: providing a stratum of said parent material having a depth from between 1 mm. to 1000 mm. within a confined space providing a microporous support for said stratum permeable to gas, the porosity of said support ranging between 1 and 200 millimicrons; passing a stream of dried uniform gas particles toward the bottom of said stratum, under a pressure permitting penetration of said gas particles therethrough uniformly dispersed; said gas being selected from gases non-reactive with said parent material; said gas stream being maintained for a period required to dehydrate said parent material to a viscosity sufficiently high to retain the wake of the stream of said gas particles uniformly dispersed in the dried resulting solid and maintaining said gas at a temperature in the range of about 2° to 80° C., whereby said material is reduced to a dehydrated micro-porous rapidly soluble substance.

2. A process as claimed in claim 1 said gas being a substantially completely moisture-free gas selected from the group consisting of inert gases and air and mixtures of air and inert gases; directing said stream through said porous support for 1 to 200 hours in upward direction and normal towards the underside of the layer of the material to be dried, the pressure at which the drying medium is forced through said porous support and through said layer of material to be dried being at least equal to the sum of pressures necessary to overcome the resistance offered to the flow by the microporous supporting material plus the hydrostatic pressure of the layer of material to be dried in addition to the flow pressure of the drying gas through the material to be dried.

3. The process of claim 2, wherein said drying medium is an inert gas such as pure nitrogen or $CO_2$ having a moisture content down to 0.002 to 0.001 g./cu. m. to correspond to a dew point of from −72° to −76° C. and said gas having been cleaned to a degree of purity from oxygen of 99.99%.

4. A process for drying aqueous dispersions as claimed in claim 1, which comprises the steps of placing an aqueous dispersion of said parent material as a stagnant layer on said support; thereafter passing said gas having a temperature of from 10° C. to 26° C. for 1 to 100 hours in upward direction through said porous support in a directional normal to the bottom surface of said layer of said aqueous dispersion; forcing said gas through said porous support and through said stratum under a pressure at least equal to the sum of pressures necessary to overcome the resistance offered to the flow by the microporous supporting material plus the hydrostatic pressure of the layer of the aqueous dispersion in addition to the flow pressure of the gas through the dispersion until all of the moisture is removed from the dispersion and the material to be dried has assumed the form of an ultrainstant dry powder.

5. A process for drying emulsions containing dissolved solid constituents, as claimed in claim 1, which comprises placing the parent material in emulsion as a stagnant layer on said support having a maximum pore diameter of 0.1 mm.; forcing, while stirring the emulsion, said gas selected from the group consisting of substantially completely moisture-free inert gases and air and mixtures of air and inert gases having a temperature of from 10 to 30° C. for 1 to 100 hours in upward direction through said porous support thereby finely dividing said gas stream and passing it in normal direction towards the bottom surface of the layer of the emulsion and forcing it through said porous support and through the layer of emulsion at a velocity of from 0.2 to 2 meters per second; discontinuing the stirring after the emulsion has assumed a highly viscous to pasty state, and continuing the forcing of said gaseous drying medium through the emulsion to be dried until the material is present as a completely dried ultrainstant, porous, pumiceous mass.

6. A process for drying pasty material, as claimed in claim 1, which comprises applying the parent material to be dried, as a pasty layer having a depth of from 1 mm. to 500 mm., to a support consisting of a microporous solid material having a maximum pore size of 0.1 mm.; keeping the mass applied to said support in slight agitation while passing gas selected from the group consisting of substantially moisture-free inert gases and air and mixtures of air and inert gases having a temperature of from 10° C. to 30° C. in upward direction and for 1 hour up to 200 hours through said porous support thereby dividing the gaseous stream of the gas into small gas particles; passing said gas particles, under a pressure of from 50 to 5000 mm., of water column in a direction vertically towards the bottom surface of the layer of pasty material to be dried and further vertically through the layer of the material to be dried; discontinuing said agitation of the material to be dried when the mass begins to solidify, and continuing said passing of said gas until all of the moisture is removed from the pasty material and the latter is present in the form of a dry, ultrainstant, pumiceous porous solid material; thereafter crumbling this material and pulverizing it.

7. A process of preparing dehydrated fruit pulp powder, as claimed in claim 1, which comprises cleaning the harvested fruits, freeing them from undesirable skin and stem components and comminuting them to said parent materials as an aqueous dispersion; placing said aqueous dispersion as a stagnant layer having a depth of from 1 mm. to 1000 mm. on a porous support consisting of a microporous solid material having a maximum pore size of 1 mm.; thereafter passing, while stirring a stream of said gas selected from the group consisting of pure nitrogen and pure $CO_2$ previously dehydrated by means of an adsorbent selected from the group consisting of alugel, silicagel and and molecular sieves to a water content down to as 0.002 to 0.001 g./cu. m. to correspond to a dew point of from −72° C. to =76° C. in upward direction and for 1 hour to 50 hours and at a temperature of from 2° C. to 80° C. and a velocity of from 0.4 to 1.5 meters per second through said porous support in a direction vertically toward the bottom surface of the layer of the dispersion thereby dividing said gas stream as it passes through the porous support and forcing it in finely divided state in upward direction through the layer of the dispersion; thereafter discontinuing the stirring and continuing for another 1 to 100 hours the gas passing through the material to be dehydrated and becoming increasingly more solid; shutting off the gas stream after complete removal of all moisture from the material to be dehydrated, and comminuting to powder the dehydrated mass present in solid, pumiceous state.

8. A process for the preparation of an ultrainstant dry coffee powder, as claimed in claim 1, which comprises placing said parent material as a coffee extract obtained from coffee beans as a stagnant layer having a depth of from 1 mm. to 1000 mm. on a support consisting of a microporous solid material having an average pore size of not greater than 0.1 mm.; forcing for a period of from 1 to 50 hours, said gas consisting of a completely moisture-free inert gas in upward direction through said porous support thereby finely dividing said gas stream; forcing said inert gas in this finely divided form from the bottom surface of the coffee extract layer through said layer at a temperature of from 10 to 30° C.; thereafter reducing to powder the dehydrated material present in solid, porous, pumiceous state.

9. A process as claimed in claim 1 for the preparation of unskimmed milk powder as said parent material 100% cold water-soluble within a few seconds, which comprises evaporating unskimmed milk under vacuum and at a temperatre of from 0° C. to 50° C. to a dry substance content of from 40 to 60%; thereafter homogenizing in a homogenizer; placing the resultant emulsion as a stagnant layer having a depth of from 1 to 500 mm. on a support consisting of a microporous solid material; thereafter forcing said gas selected from the group consisting of completely moisture-free inert gases and air and mixture of air and inert gases having a temperature of from 10 to 30° C. in upward direction and for 1 to 80 hours through said porous support thereby dividing said gas stream; directing the gas in the finely divided form onto the bottom surface of the layer of unskimmed milk emulsion to be dehydrated and forcing it through said layer of unskimmed milk emulsion at a velocity of from 0.2 to 3.0 meters per second; discontinuing the gas supply upon complete removal of the moisture content from the emulsion, and reducing to powder the resultant porous dehydrated material present in solid form.

10. A process as claimed in claim 1, for the preparation of an ultrainstant dry powder from said parent material comprising a mixture of susbtances which are solid and liquid, and which mixture is a liquid at the operating temperature, which comprises placing the mixture to be dried in the form of a stagnant layer having a depth of from 1 mm. to 500 mm. on a porous support having the form of a belt conveyor and consisting of a microporous solid material; forcing a gaseous drying medium selected from the group consisting of substantially completely moisture-free inert gases and air and mixtures of air and inert gases and having a temperature of from 2° C. to 80° C. for a period of from 1 to 200 hours through said porous support in upward direction and normal to the direction of motion of said belt conveyor thereby dividing said gaseous drying medium; directing said finely divided drying medium in a direction vertically toward the bottom surface of, and through the layer of the mixture to be dried while maintaining said drying medium under a pressure of from 50 to 5000 mm. water column; discharging the mixture being dried from the belt conveyor after complete removal of the moisture content therefrom, in a solid, porous, pumiceous state, and reducing it to powder.

11. A process as claimed in claim 1 for the preparation of unskimmed milk powder 100% cold water-soluble within a few seconds, which comprises evaporating unskimmed milk under normal conditions in countercurrent direction with $N_2$-gas to a dry substance content of from 40 to 60%; placing the resultant emulsion as a stagnant layer having a depth of from 1 to 500 mm. on a support consisting of a microporous solid material; thereafter forcing said gas selected from the group consisting of completely moisture-free inert gases and air and mixtures of air and inert gases having a temperature of from 10 to 30° C. in upward direction and for 1 to 80 hours through said porous support thereby dividing said gas stream; directing the gas in this finely divided form onto the bottom surface of the layer of unskimmed milk emulsion to be dehydrated and forcing it through said layer of unskimmed milk emulsion at a velocity of from 0.2 to 0.3 meter per second; discontinuing the gas supply upon complete removal of the moisture content from the emulsion, and reducing to powder the resultant porous dehydrated material present in solid form.

12. A process as claimed in claim 1 for the preparation of an ultrainstant dry powder from said parent material comprising a mixture of substances which are solid and liquid, and which mixture is a liquid at the operating temperature, which comprises placing the mixture to be dried in the form of a stagnant layer having a depth of from 1 mm. to 500 mm. on a support having the form of a belt conveyor and consisting of a microporous solid material; forcing through said porous conveyor belt in upward direction said gas selected from the group consisting of substantially moisture-free inert gases and air and mixtures of air and inert gases and having a temperature of from 10 to 30° C. toward the bottom surface of the material to be dried in a first section of the material to be dried and, within this first section, through the layer of the material to be dried; withdrawing, at the surface of the material to be dried, the inert gas having been forced through the layer of material to be dried in said first section and returning said inert gas to the underside of the material to be dried in a second section of the layer and forcing it again in this second section in upward direction through the porous support and toward the underside of the material to be dried in this second section and through the layer of material to be dried in this second section; withdrawing said inert gas from the surface of the material to be dried in said second section and returning it repeatedly to the bottom surface of additional partial sections of the layer of material to be dried prior to subjecting said inert gas to drying and returning it to the starting point of the process, and reducing to powder the material after having been substantially freed from moisture and being present in a solid porous form.

13. In a drying process as claimed in claim 1, said parent material being a mixture of substances containing at least one liquid component the improvement, which comprises passing said drying gas upwardly through a bed of the mixture at a flow velocity and rate sufficient to subdivide the bed into a dispersed system, and progressively converting the bed in an upward direction to a solid, highly porous cake capable of being readily converted to finely divided form.

14. In a drying process as claimed in claim 1, said parent material being a viscous mass containing at least one solid component is dried to a solid state, the improvement which comprises passing said drying gas upwardly through a film of a porous material and through a bed of said viscous mass arranged in a manner as overlaying said film of a porous material, while adjusting the flow velocity and rate of said gas as well as the size of said pores within said porous material sufficiently to subdivide said bed into an optimal degree of dispersion and progressively converting the bed in an upward direction to a solid, highly porous cake, while maintaining a temperature of from 0° C. to 80° C. and adjusting the pressure at which said drying gas is flowed through said bed progressively to an amount sufficient to continuously maintain said optimal degree of dispersion of the bed in relation to the progressively varying state of conversion to solid form.

References Cited

UNITED STATES PATENTS

| | | | |
|---|---|---|---|
| 668,159 | 2/1901 | Campbell | 99—201 |
| 818,979 | 4/1906 | Scheele | 99—199 X |
| 2,750,998 | 6/1956 | Moore | 99—206 X |
| 2,876,557 | 4/1959 | Ducatteau | 34—57 |
| 3,039,107 | 6/1962 | Bradford | 159—48 |

MAURICE W. GREENSTEIN, Primary Examiner

U.S. Cl. X.R.

34—22, 38; 99—71, 201, 204, 206; 159—16, 47